Feb. 15, 1927.  A. M. GIFFORD ET AL  1,617,709
TRAILER HITCH
Filed May 7, 1925
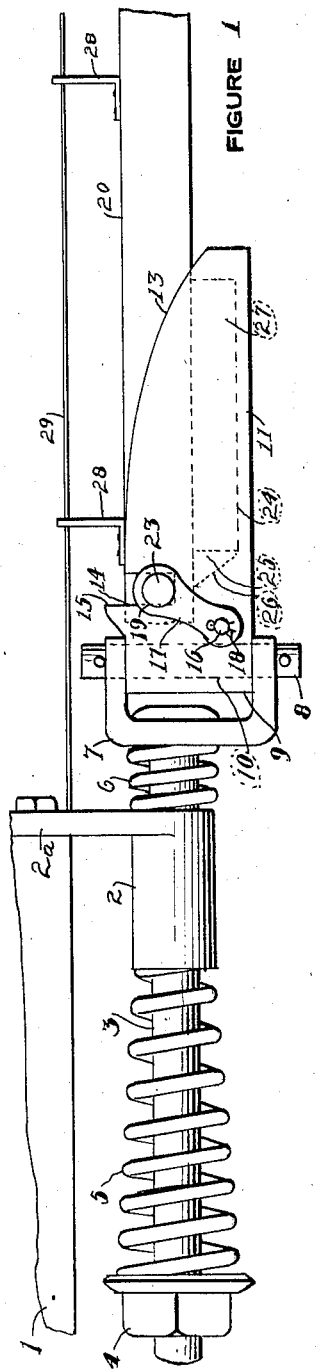
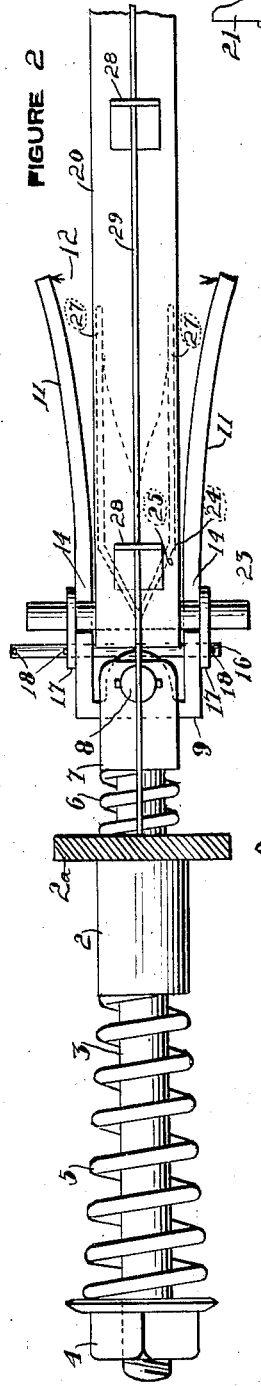
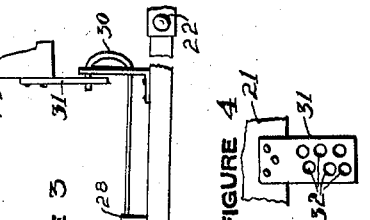
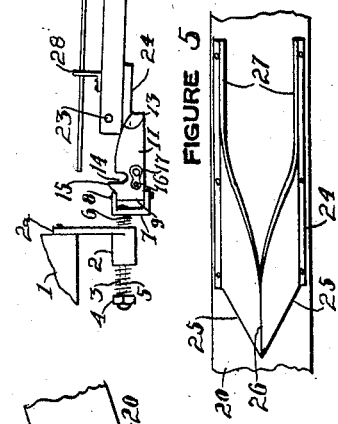
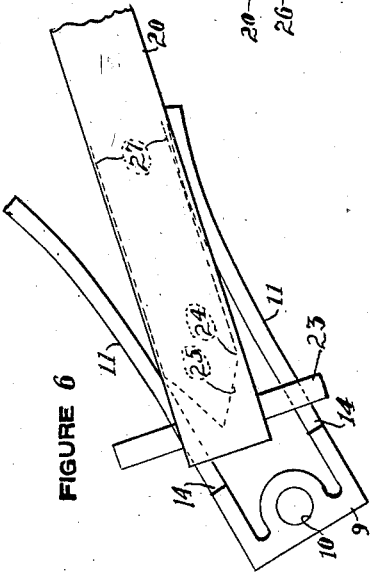
INVENTORS
Arnold M. Gifford
Robert Smith
BY John A. Naismith
ATTORNEY Patented Feb. 15, 1927.

1,617,709

UNITED STATES PATENT OFFICE.

ARNOLD M. GIFFORD AND ROBERT SMITH, OF NEAR SAN JOSE, CALIFORNIA.

TRAILER HITCH.

Application filed May 7, 1925. Serial No. 28,650.

Our invention relates particularly to a device for effecting the automatic coupling of a trailer to an automotive truck.

It is one object of the invention to provide a device of the character indicated that will enable the coupling of the trailer to the truck to be effected by the driver of the truck while operating the same.

It is another object of the invention to provide a device of the character indicated that will permit relative movement of the trailer and truck in both a vertical plane and a horizontal plane and about a horizontal axis passing longitudinally therethrough.

It is still another object to provide a device in which means is provided for effectually locking the separable parts of the coupling together.

Finally it is an object to provide a device of the character indicated that will be simple in construction, economical to manufacture, durable, and highly efficient in its practical application.

In the drawing:—

Figure 1 is a side elevation of the device, part broken away.

Figure 2 is a plan view of the same.

Figure 3 is a side elevation of the device with the coupling disengaged.

Figure 4 is a detail elevation of the pole positioning plate.

Figure 5 is a bottom plan view of a portion of the trailer pole with the guide member thereon.

Figure 6 is a diagrammatical illustration of the operation of the device.

Referring more particularly to the drawing, 1 indicates a part of the rear portion of a truck body having a depending plate $2^a$ mounted thereon and carrying a bearing element 2 extending forwardly under the truck body and parallel therewith. Journaled in element 2 is a rod 3 carrying a terminal nut 4 and having a spring 5 mounted thereon between nut 4 and element 2. Another spring 6 is mounted on the rod 3 to bear against the rear surface of plate 2 and a yoke 7 is fixedly mounted on the rear end of rod 3 as shown, the said yoke being normally positioned in a vertical plane and having a pin 8 passing therethrough as shown.

At 9 we show a coupler element pivotally mounted on pin 8 as at 10 and having two spaced side portions 11—11 extending rearwardly therefrom, these side portions being substantially parallel for a distance and then diverging toward their rear extremities as at 12, their upper edges curving downwardly as at 13 from a point adjacent to said pivotal mounting to their free ends.

In the upper edges of sides 11—11 and between said curved portions and said pivotal mounting are formed notches 14—14, these notches being in alignment and having their forward edges extending above the upper edges of the said side portions as shown at 15—15.

At 16 is shown a pin passing through sides 11—11 and adjacent to their lower edges and having plates 17—17 freely pivoted thereon and held by cotter pins 18—18. These plates are provided with holes 19 so positioned as to swing into alignment with notches 14—14.

It may be readily seen from the foregoing description that the coupler element 9 may rotate freely through the medium of the rod 3 in bearing 2, and that it may swing freely about the normally vertical pin 8.

At 20 is shown a portion of a trailer pole having the usual pivotal connection to a trailer body 21 as at 22. In the forward end of this pole is inserted a pin 23 extending transversely therethrough and adapted to engage notches 14—14 in element 9. When so engaged it may be locked in position by slipping the plates 17—17 thereon and inserting cotter-pins 18 as described.

On the lower surface of the forward end of pole 20 is placed a guide element 24 having a forwardly tapering end 25 and having its forward end tapered downwardly as at 26. From this tapered portion the sides of the element extend rearwardly a distance and then straighten out into parallel relation to each other as at 27.

At 28—28—28 are shown supports mounted on the upper surface of pole 20. In these supports is slidably mounted a rod 29 curving upwardly at its rear end as at 30. At 31 is shown a plate fixedly mounted on the body of trailer 21 and depending therefrom a distance forwardly of the pivotal connection of the pole 20 thereto. In this plate are formed a plurality of holes 32 through which the curved end of rod 29 may pass.

Assuming the device to have been constructed and assembled as hereinbefore set forth the coupling operation is as follows.

First the pole 20 is raised to a point where the pin 23 will engage element 9 when the two are brought together, or slightly thereabove, and the end 30 of rod 29 inserted in a hole 32 in plate 31, this operation effectually supporting the pole in the desired position without further manual attention.

The driver now manipulates the truck, backing it to the trailer. In this operation the guide element 24 enters between the side portions 11—11 of element 9, and even though the two parts may not be in alignment at the beginning of the operation the sides of guide 24 will engage the sides 11—11 of the element 9 as shown in the diagram, and swing it about its pivot 8 until the desired alignment is secured. As the operation continues rod 29 engages the rear of track 1 and is forced out of engagement with supporting pole 31 thereby permitting the pole 20 to drop with the pin 23 engaging notches 14.

The driver now locks the pin 23 in position as described and the operation is completed.

By means of this construction the coupling may be effected by the operator of the truck without other assistance regardless of the character of the ground over which he is operating although, of course, he will have to leave his seat on the vehicle to position the plates 17 over the ends of elements 23. Also when drawing the trailer over various uneven surfaces sufficient relative movement is permitted between truck and trailer to eliminate all danger of breaking the coupling, the pivotal movement of pin 23 in notches 14—14 being added to the pivotal movement of element 9 about pin 8 and the rotative movement of rod 3 in bearing 2 hereinbefore described.

By providing the upwardly extending parts 15—15 the proper seating of pin 23 is assured since its engagement with one of said parts will swing the element 9 until it also engages the other part 15 and is so positioned as to drop straight into notches 14.

It is to be understood, of course, that while we have herein shown and described but one specific embodiment of our invention, changes in form, construction and method of operation may be made within the scope of the appended claims.

We claim:—

1. The combination with a motor vehicle and a vehicle drawn thereby, of a support resiliently and revolubly mounted on one vehicle, a coupling element pivotally connected to said support, a pole pivotally mounted on the other vehicle, coupling element engaging means carried by said pole, disengageable means for supporting said pole in an elevated position, and vehicle operated means for actuating said pole supporting means to permit engagement of the coupling engaging means with the coupling element.

2. The combination with a motor vehicle and a vehicle drawn thereby, of a support resiliently and revolubly mounted on one vehicle, a coupling element pivotally connected to said support and provided with diverging sides having seats formed therein, a pole pivotally mounted on the other vehicle, means carried by said pole for engaging said seats, and a guide element carried by said pole and engageable with the said sides for swinging the coupling element into alignment with the pole.

3. The combination with the motor vehicle and a vehicle drawn thereby, of a support resiliently and revolubly mounted on one vehicle, a coupling element pivotally connected to said support and provided with diverging sides having sloping upper edges and having seats formed therein, a pole pivotally mounted on the other vehicle, means carried by said pole for engaging said seats, and a guide element carried by said pole and engageable with said sides for swinging the coupling element into alignment with the pole.

4. A trailer hitch comprising a coupling part mounted to swing laterally and including diverging sides formed with seats, and a cooperating coupling part movable between the sides and provided with a cross coupling pin engageable in the seats.

5. A trailer hitch comprising a coupling part mounted to swing laterally and including diverging sides formed with seats, a cooperating coupling part movable between the sides and provided with a cross coupling pin engageable in the seats, and means on the second coupling part for engaging the sides and guiding the same therebetween.

6. A trailer hitch comprising a coupling part mounted to swing laterally and including diverging sides formed with seats, a cooperating coupling part movable between the sides and provided with a cross coupling pin engageable in the seats, and means on the first coupling part for locking the coupling pin in its seat.

7. A trailer hitch comprising a coupling part mounted to swing laterally and including diverging sides formed with seats, a cooperating coupling part movable between the sides and provided with a cross coupling pin engageable in the seats, means for holding the coupling parts out of coupling relation to permit the coupling pin moving to a position above its seats, and means for rendering the holding means inoperative upon the coupling pin assuming said position over the seats.

8. A trailer hitch comprising a coupling part mounted to swing laterally and including diverging sides formed with seats, a cooperating coupling part movable between the sides and provided with a cross coupling pin engageable in the seats, means for holding the coupling parts out of coupling relation to permit the coupling pin moving to a position above its seats, means for rendering the holding means inoperative upon the coupling pin assuming said position over the seats, and means on the second coupling part for engaging the sides and guiding the same therebetween.

9. The combination with a motor vehicle and a vehicle drawn thereby, of a support resiliently and revolubly mounted on one vehicle, a coupling element pivotally connected to said support and provided with diverging sides having sloping upper edges provided with notches, a pole pivotally mounted on the other vehicle, means carried by the pole for engaging said notches, and a guide element carried by the pole and engageable with said sides for swinging the coupling element into alignment with the pole.

10. The combination with a motor vehicle and a vehicle drawn thereby, of a support resiliently and revolubly mounted on one vehicle, a coupling element pivotally connected to said support and provided with diverging sides having seats formed therein, a pole pivotally mounted on the other vehicle, means carried by said pole for engaging said seats, and a tapering guide element mounted on the under side of said pole and engageable with the said sides for swinging the coupling element into alignment with the pole.

11. The combination with a motor vehicle and a vehicle drawn thereby, of a coupling part carried by the motor vehicle, a pole pivotally mounted on the other vehicle, a rod slidably mounted on said pole and extending beyond the free end thereof, detachable means for connecting the rod to the vehicle for supporting the pole at a fixed elevation, said rod being operated to release the pole when actuated by backing the motor vehicle into it, and a coupling part carried by the pole engageable with the coupling part on the motor vehicle when the pole is released.

12. The combination with a motor vehicle and a vehicle drawn thereby, of a support resiliently and revolubly mounted on one vehicle, a coupling element pivotally connected to said support and provided with diverging sides having sloping edges provided with notches, a pole pivotally mounted on the other vehicle, means carried by the pole for engaging said notches, and a guide element carried by the pole and engageable with said sides for swinging the coupling element into alignment with the pole, and fastening means mounted on said coupling element and cooperating with the notches therein for securing the notch engaging means on said pole against displacement.

ARNOLD M. GIFFORD.
ROBERT SMITH.